United States Patent

Schramm

[15] 3,677,369
[45] July 18, 1972

[54] AUTOMOTIVE OIL CRANK CASE DRAIN VALVE

[72] Inventor: Richard F. Schramm, 4359 Weber Road, St. Louis, Mo. 63123

[22] Filed: Jan. 4, 1971

[21] Appl. No.: 103,653

[52] U.S. Cl. .............................. 184/1.5, 251/144, 251/315
[51] Int. Cl. ................................. F01m 11/04, F16k 31/44
[58] Field of Search ............... 251/144, 297, 315; 184/1.5

[56] References Cited

UNITED STATES PATENTS

| 3,367,623 | 2/1968 | Piel | 251/144 |
|---|---|---|---|
| 3,589,675 | 6/1971 | Scaramucci | 251/315 X |
| 2,371,657 | 3/1945 | Stack | 251/297 X |
| 3,115,283 | 12/1963 | Lindgren | 251/367 X |
| 3,310,133 | 3/1967 | Eaker | 184/1.5 |
| 3,049,334 | 8/1962 | Montague | 251/144 X |

Primary Examiner—Manuel A. Antonakas
Attorney—Rogers, Ezell, Eilers & Robbins

[57] ABSTRACT

A drain valve for automotive crank cases. The drain valve is substituted for the usual crank case drain plug and is in the form of a threaded plug having a manually operable valve permitting drainage of the crank case oil without removal of the plug. A spherical valve body is seated in a hemispherical valve seat provided in the plug and by means of radial arms extending from the valve body and which are journaled between the plug and a cap, rotation provides for registry of a diametrical opening in the valve body with a plug opening to drain the oil. Operation of the valve arms can be effected either manually, by a screw driver, wrench or the like, or by remote control by linkage connecting the operating arm to a remote control handle on the dashboard of an automobile. A simple cap held in by struckover flanges holds the valve body in the plug and permits ready assemblage.

2 Claims, 8 Drawing Figures

Patented July 18, 1972

3,677,369

INVENTOR
RICHARD F. SCHRAMM
BY
ROGERS, EZELL,
EILERS & ROBBINS
ATTORNEYS 3,677,369

AUTOMOTIVE OIL CRANK CASE DRAIN VALVE

SUMMARY OF THE INVENTION

This invention provides a simply installed crank case drain valve which permits the ready drainage of oil when oil is to be changed in an automobile. In the past, the conventional drain plug has been required to be removed causing a sudden gushing of oil which contaminates the area and causes soiling of the operator. Drain valves have been provided in substitution of a drain plug but have been complicated in structure and expensive and have inherent problems in leakage and maintenance.

By means of the instant invention, a very simple crank case drain valve has been provided which can be made at low cost and is simply installed by merely removing the conventional threaded drain plug valve and substituting the instant drain valve.

The drain valve is in the form of a threaded plug having an opening adapted to be closed by a spherical ball valve. The ball valve has cylindrical arms extending through the plug and journaled therein between the plug and a cap of mating configuration. Operation is effected through one of the ball valve arms, either by a screw driver insertable into a slotted, exposed end of one of the arms, or by connection through conventional operating linkages to an operating handle on the dashboard of an automobile. The ball valve is simply rotated from an open to a closed position. A stop and detent mechanism is provided in the closed position to prevent accidental dislodgement and opening of the valve.

The drain valve is simple in construction and inexpensive to manufacture through the provision of a cap which retains and presses the ball valve against a sealing O-ring. The valve may be installed and operated by the average user and is rugged and efficient in operation.

The above features are objects of this invention and further objects will appear in the detailed description which follows and will be otherwise apparent to those skilled in the art.

For the purpose of illustration, there is shown in the accompanying drawings the preferred embodiment of the invention. It is to be understood that these drawings are for the purpose of example only and the invention is not limited thereto.

DESCRIPTION OF THE INVENTION

Figure 1:
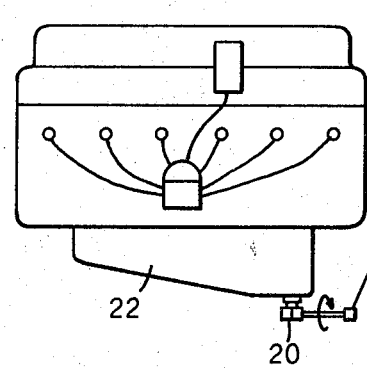
FIG. 1 is a pictorial view in elevation showing a crank case with the drain plug of this invention attached to a remote control operating device.

The drain valve of this invention, generally indicated by reference numeral 20 is shown in FIG. 1 connected to the bottom of an automotive crankcase 22. A remote control for operation to an automotive dashboard is shown through operative linkage 24 and an operating handle 26 located on the dashboard 28.

The valve is comprised of main component parts consisting of a plug 30, a spherical valve body 32, a sealing O-ring 34 and a cap 36 adapted to hold the valve body in the plug.

The plug 30 is similar to a conventional drain plug in that it has a threaded portion 38 receivable within a conventional threaded opening at the bottom of the crankcase. The plug is further provided with a funnel-shaped opening 40 at the top which leads into a drain passage 42. The bottom of the plug is provided with a conventional hexagonal configuration 44 so as to receive a wrench in the initial installation. A pair of U-shaped grooves 46 are provided on opposite sides of the bottom to receive arms of the valve body later to be described. A socket opening 48 is enlarged at the interior of the plug to receive the spherical portion of the valve body and a O-ring 34 for sealing the valve body preventing leakage. The O-ring 34 seats within a shoulder provided in the socket opening 48.

Figure 8:
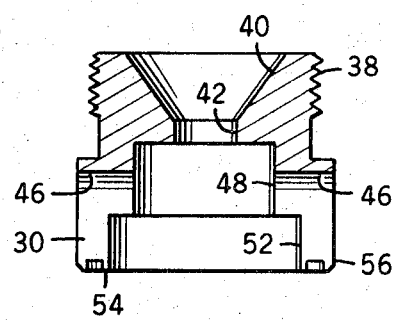
FIG. 8 is a view in section taken along the line 8—8 of FIG. 7 prior to the striking over of the retaining flange.

In order to provide for retention of a valve body retaining cap, the bottom of the plug has an enlarged stepped opening 52 as best shown in FIG. 8. A flange 54 is shaped in the annular rim 56 of the bottom of the plug in order that it may be struck over inwardly to retain the retaining cap, as will be further described.

Figure 7:
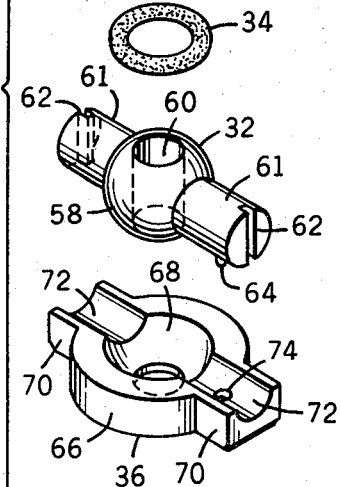
FIG. 7 is an exploded view of the components of the drain plug prior to assembly.
Figure 4:
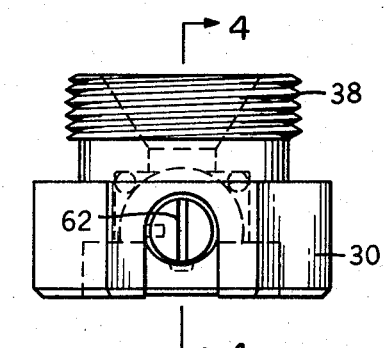
FIG. 4 is a view in elevation taken similarly to FIG. 2 but showing the drain plug turned from the closed to open position.
Figure 5:
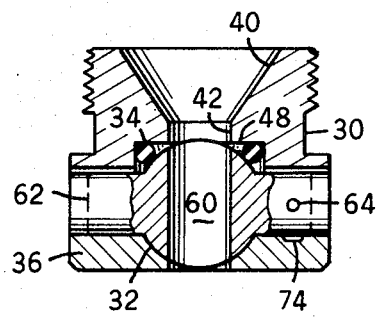
FIG. 5 is a view in section taken along the line 5—5 of FIG. 4.

The valve body 32 is best shown in the exploded view of FIG. 7. As there shown, it has a main spherical valve body portion 58 provided with a diametrical opening or passage 60 which is adapted to be turned into and out of registry with the drain passage 42 in the plug. A pair of opposed cylindrical arms 61 are diametrically connected to the valve body and seat within the U-shaped grooves 46 in the plug. Slotted openings 62 are provided in order that manual operation by a screw driver can be effected when the remote control linkage to the dashboard is not utilized. A detent stud 64 is provided at the bottom of one of the operating arms which is adapted to seat within a mating detent in the form of a shallow groove in the cap, which will be further described.

Figure 6:
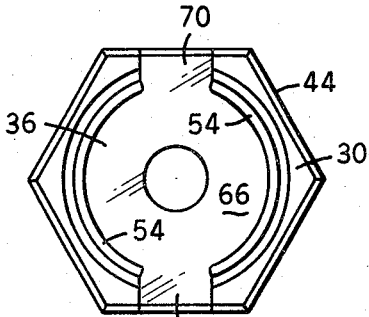
FIG. 6 is a bottom plan view of the drain plug.

The retaining cap 36 is best shown in FIG. 7 and the plan view of FIG. 6. The cap has a shallow, cylindrical, main body portion 66 which has a hemispherical socket 68 adapted to fit over the bottom of the ball valve. A pair of arms 70 extend diametrically from the cap and are each provided with hemi-cylindrical grooves 72. The grooves serve as a journal surface to retain the cylindrical arms of the valve body and the arms 70 seat within the grooves 46 of the plug. One of the arms 70 is provided with a shallow detent recess 74 which is in registry with the detent stud 64 in the closed position, which serves as a detent to maintain the valve in closed position, to be overridden only by the application of a manual valve opening force.

The retaining cap is simply held in position in the plug and the valve body retaining relationship by applying force and striking over the retaining flange 54 at the bottom of the plug, so as to crimp over the edges of the retaining cap.

USE

The drain valve of this invention is very simply employed in the conventional automotive crank case. The conventional solid drain plug is first removed and the drain valve is simply substituted in its place by threading it in the threaded opening of the crankcase drain pan. A secure, tightening force is effected by a conventional wrench applied to the hexagonal body 44 of the plug.

Figure 2:
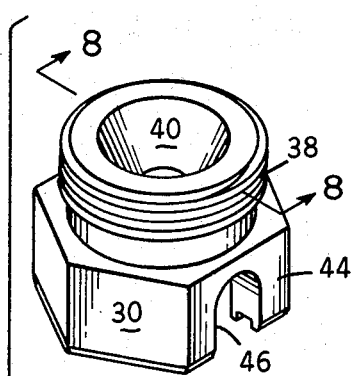
FIG. 2 is an enlarged view in elevation of the drain plug.
Figure 2:
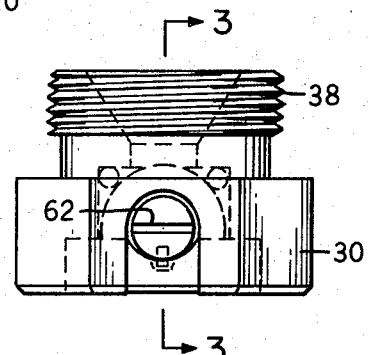
Figure 3:
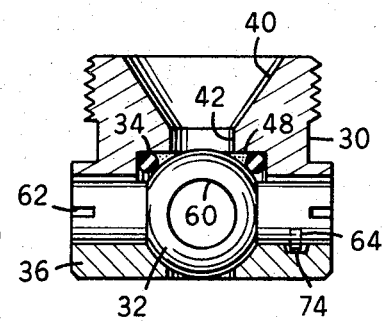
FIG. 3 is a view in section taken along the line 3—3 of FIG. 2.

In the normal operation, the valve body is turned to the closed position as shown in FIGS. 2 and 3. In this position, the detent stud 64 is seated in the shallow recess 74 of the cap and the valve is completely closed.

When the valve is desired to be opened to drain dirty oil, a screw driver is inserted in the slot 62 at the end of the valve body operating arm and the valve is simply turned a quarter turn in either direction, to open the valve and present the valve passage in registry with the drain passage 42 of the plug.

Upon the completion of the draining operation, the operator returns the valve to the closed position where the stud 64 seats in the recess 74. The entire operation can be effected without the operator touching the drain valve and without any contamination of the hands of the operator.

Where desired, the drain valve can be operated by remote control by simply connecting a linkage 24 to one of the operating arms 60 of the drain valve body, as shown in FIG. 1. By such connection, an operator by operating the handle 26, can open or close the drain valve from the seat of the automobile, without being required to physically contact the operating arms of the valve body.

Various changes and modifications may be made within this invention as will be obvious to those skilled in the art. Such changes and modifications are within the scope and teaching of this invention as defined by the claims appended hereto.

What is claimed is:

1. A drain plug for an automotive crankcase comprising a plug threadedly receivable in a threaded opening in the bottom of the crankcase, said plug being provided with a ball valve, said ball valve being comprised of a spherical valve body having a valve passage rotatable into registry with a valve opening in the plug communicating on one side of the valve body with the interior of the crankcase and on an opposed side of the valve body with the exterior of the plug, said valve body being pressed into a socket opening provided in the plug against a sealing O-ring, said socket opening being provided with a shoulder against which the O-ring is seated, said plug being provided with a cap fitting over the ball valve body into the plug socket, said cap having a mating hemispherical socket acting as a journal for the valve body, and said cap being further provided with a pair of opposed radially extending arms having hemicylindrical grooves acting as a journal for the arms of the valve body.

2. A drain plug for an automotive crankcase comprising a plug threadedly receivable in a threaded opening in the bottom of the crankcase, said plug being provided with a ball valve, said ball valve being comprised of a spherical valve body having a valve passage rotatable into registry with a valve opening in the plug communicating on one side of the valve body with the interior of the crankcase and on an opposed side of the valve body with the exterior of the plug, said valve body being pressed into a socket opening provided in the plug against a sealing O-ring, said socket opening being provided with a shoulder against which the O-ring is seated, said valve body being provided with a pair of opposed radially extending cylindrical arms journalled in cylindrical openings in the plug and means on one of said arms receiving a tool to open and close the valve and detent means provided on one of the cylindrical arms to maintain the valve body in the closed position against minor dislodgement forces, said detent means being adapted to be overridden by manual force applied to operate the valve body to an open position.

* * * * *